(12) United States Patent
Wang et al.

(10) Patent No.: US 12,468,196 B2
(45) Date of Patent: Nov. 11, 2025

(54) ARRAY SUBSTRATE AND DISPLAY PANEL

(71) Applicants: BEIJING BOE DISPLAY TECHNOLOGY CO., LTD., Beijing (CN); BOE TECHNOLOGY GROUP CO., LTD., Beijing (CN)

(72) Inventors: Jianjun Wang, Beijing (CN); Jiliang Zhang, Beijing (CN); Yuting He, Beijing (CN); Wei Cao, Beijing (CN); Yupeng Wang, Beijing (CN)

(73) Assignees: Beijing BOE Display Technology Co., Ltd., Beijing (CN); Beijing BOE Technology Development Co., Ltd., Beijing (CN)

(*) Notice: Subject to any disclaimer, the term of this patent is extended or adjusted under 35 U.S.C. 154(b) by 0 days.

(21) Appl. No.: 18/739,568

(22) Filed: Jun. 11, 2024

(65) Prior Publication Data

US 2024/0329463 A1 Oct. 3, 2024

Related U.S. Application Data

(63) Continuation of application No. 17/800,044, filed as application No. PCT/CN2021/110969 on Aug. 5, 2021, now Pat. No. 12,038,651.

(30) Foreign Application Priority Data

Sep. 11, 2020 (CN) .......................... 202021984200.2

(51) Int. Cl.
*G02F 1/1339* (2006.01)
*G02F 1/1362* (2006.01)

(52) U.S. Cl.
CPC ...... *G02F 1/13394* (2013.01); *G02F 1/13396* (2021.01); *G02F 1/136286* (2013.01)

(58) Field of Classification Search
CPC ............ G02F 1/13394; G02F 1/13396; G02F 1/136286; G02F 1/1368; G02F 1/136295;
(Continued)

(56) References Cited

U.S. PATENT DOCUMENTS

2015/0028343 A1  1/2015 Li
2015/0185566 A1  7/2015 Choi et al.
(Continued)

FOREIGN PATENT DOCUMENTS

CN  101995700 A  3/2011
CN  102981337 A  3/2013
(Continued)

OTHER PUBLICATIONS

PCT International Search Report and Written Opinion (w/ English translation) for corresponding PCT Application No. PCT/CN2021/110969, mailed on Oct. 25, 2021, 21 pages.

(Continued)

*Primary Examiner* — Angela M. Medich
(74) *Attorney, Agent, or Firm* — Dority & Manning, P.A.

(57) ABSTRACT

An array substrate includes a first base substrate, a plurality of gate lines and at least one metal platform. The plurality of gate lines are disposed on the first base substrate and extend in a first direction. The at least one metal platform is disposed on the first base substrate. A metal platform of the at least one metal platform is integrated with a corresponding gate line of the plurality of gate lines, and the metal platform includes a first protrusion and a second protrusion that are arranged on both sides of the corresponding gate line along a second direction, respectively, where the first direction intersects the second direction.

17 Claims, 8 Drawing Sheets

(58) Field of Classification Search
CPC ......... G02F 1/136213; G02F 1/134318; G02F 1/134363; G02F 1/136218; G02F 2201/121; G02F 2201/123; G09G 2300/0426
See application file for complete search history.

(56) References Cited

U.S. PATENT DOCUMENTS

| | | |
|---|---|---|
| 2015/0192834 A1* | 7/2015 | Morinaga ......... G02F 1/136213 349/39 |
| 2015/0253608 A1 | 9/2015 | Cho |
| 2016/0187688 A1 | 6/2016 | Wen |
| 2017/0184900 A1 | 6/2017 | Jang |
| 2018/0108676 A1* | 4/2018 | Cheng .................. G02F 1/1362 |
| 2019/0079328 A1 | 3/2019 | Wang et al. |
| 2019/0196288 A1 | 6/2019 | Xu et al. |
| 2020/0166796 A1 | 5/2020 | Okuyama et al. |
| 2020/0174300 A1 | 6/2020 | Cheng et al. |
| 2021/0026211 A1 | 1/2021 | Yoshida et al. |
| 2022/0365384 A1 | 11/2022 | Wang |
| 2023/0070022 A1 | 3/2023 | Wang et al. |

FOREIGN PATENT DOCUMENTS

| | | |
|---|---|---|
| CN | 106324881 A | 1/2017 |
| CN | 107037628 A | 8/2017 |
| CN | 212569352 U | 2/2021 |
| KR | 20040059647 A | 7/2004 |
| KR | 20080100903 A | 11/2008 |
| KR | 20180066621 A | 6/2018 |

OTHER PUBLICATIONS

Non-Final Office Action received in corresponding U.S. Appl. No. 17/800,044, dated Jun. 30, 2023, 23 pages.
Notice of Allowance received in corresponding U.S. Appl. No. 17/800,044, dated Mar. 28, 2024, 13 pages.

* cited by examiner

ARRAY SUBSTRATE AND DISPLAY PANEL

CROSS-REFERENCE TO RELATED APPLICATIONS

This application is a continuation of U.S. patent application Ser. No. 17/800,044, filed on Aug. 16, 2022, which claims priority to International Patent Application No. PCT/CN2021/110969 filed on Aug. 5, 2021, which claims priority to Chinese Patent Application No. 202021984200.2, filed on Sep. 11, 2020, which are incorporated herein by reference in their entirety.

TECHNICAL FIELD

The present disclosure relates to the field of display technologies, and in particular, to an array substrate, a display panel and a display device.

BACKGROUND

Liquid crystal display (LCD) devices have been widely used due to advantages such as low power consumption, miniature size, light weight and small thickness.

SUMMARY

In an aspect, an array substrate is provided. The array substrate includes a first base substrate, a plurality of gate lines, and at least one metal platform. The plurality of gate lines are disposed on the first base substrate and extend in a first direction. The at least one metal platform is disposed on the first base substrate. A metal platform of the at least one metal platform is integrated with a corresponding gate line of the plurality of gate lines, and the metal platform includes a first protrusion and a second protrusion that are arranged on both sides of the corresponding gate line along a second direction, respectively, where the first direction intersects the second direction.

In some embodiments, the array substrate further includes a plurality of pixel electrodes disposed on the first base substrate; for a pixel electrode closest to the metal platform, an orthographic projection of the pixel electrode on the first base substrate is non-overlapping with an orthographic projection of the metal platform on the first base substrate; and/or the array substrate further includes a plurality of common electrodes disposed on the first base substrate; for a common electrode closest to the metal platform, an orthographic projection of the common electrode on the first base substrate is non-overlapping with an orthographic projection of the metal platform on the first base substrate.

In some embodiments, the pixel electrode has a notch proximate to the second protrusion, and/or the common electrode has a notch proximate to the second protrusion.

In some embodiments, the array substrate further includes a plurality of common electrode lines, disposed on the first base substrate and extending in the first direction. A portion, proximate to the second protrusion, of a common electrode line adjacent to the corresponding gate line includes a depression; and the depression has an opening facing the second protrusion, and a shape of the depression matches a shape of a contour of the second protrusion.

In some embodiments, a distance between a border, proximate to the second protrusion, of the depression and a border, proximate to the depression, of the second protrusion is substantially constant.

In some embodiments, the array substrate further includes a plurality of common electrode lines, disposed on the first base substrate and extending in the first direction. The at least one metal platform includes a plurality of metal platforms; at least one of the plurality of metal platforms is integrated with the corresponding gate line, and another at least one of the plurality of metal platforms is integrated with a corresponding common electrode line of the plurality of common electrode lines.

In some embodiments, a shape of an orthographic projection of the metal platform on the first base substrate is a circle or a polygon.

In some embodiments, the array substrate further includes a plurality of data lines, disposed on a side, away from the first base substrate, of the plurality of gate lines and extending in the second direction. The metal platform is located between two adjacent data lines; and an orthographic projection of the metal platform on the first base substrate is non-overlapping with orthographic projections of the plurality of data lines on the first base substrate.

In another aspect, a display panel is provided. The display panel includes the array substrate as described in any one of the above embodiments, an opposite substrate, a liquid crystal layer, and a plurality of spacers. The opposite substrate is disposed opposite to the array substrate. The liquid crystal layer is disposed between the array substrate and the opposite substrate. The plurality of spacers are disposed on a side of the opposite substrate proximate to the array substrate. At least one spacer of the plurality of spacers is disposed opposite to the at least one metal platform; and an orthographic projection of an end, proximate to the first base substrate, of each of the at least one spacer on the first base substrate is located within an orthographic projection of a corresponding metal platform of the at least one metal platform on the first base substrate.

In some embodiments, a minimum distance between a border of the orthographic projection of the end, proximate to the first base substrate, of each of the at least one spacer on the first base substrate and a border of the orthographic projection of the corresponding metal platform of the at least one metal platform on the first base substrate is greater than zero.

In some embodiments, in a same direction, for the orthographic projection of the corresponding metal platform on the first base substrate, a dimension passing through a geometric center thereof is a first dimension; and for the orthographic projection of the end, proximate to the first base substrate, of each of the at least one spacer on the first base substrate, a dimension passing through a geometric center thereof is a second dimension. The first dimension is greater than or equal to a sum of the second dimension and a fitting allowance of the array substrate and the opposite substrate.

In some embodiments, the first dimension is greater than or equal to 1.43 times to 2.8 times the second dimension, inclusive.

In some embodiments, a ratio of an area of the orthographic projection of the corresponding metal platform on the first base substrate to an area of the orthographic projection of the end, proximate to the first base substrate, of each of the at least one spacer on the first base substrate is in a range of 4:1 to 5:1, inclusive.

In some embodiments, a shape of the orthographic projection of the corresponding metal platform on the first base substrate is substantially same as a shape of the orthographic projection of the end, proximate to the first base substrate, of each of the at least one spacer on the first base substrate.

In some embodiments, the plurality of spacers include a plurality of first spacers and at least one second spacer; along a direction perpendicular to a surface of the first base substrate where the plurality of gate lines and the at least one metal platform are arranged, a dimension of each first spacer is greater than a dimension of each second spacer; and the at least one spacer disposed opposite to the at least one metal platform is the at least one second spacer.

In yet another aspect, another array substrate is provided. The array substrate includes a first base substrate, a plurality of common electrode lines, and at least one metal platform. The plurality of common electrode lines are disposed on the first base substrate and extend in a first direction. The at least one metal platform is disposed on the first base substrate. A metal platform of the at least one metal platform is integrated with a corresponding common electrode line of the plurality of common electrode lines, and the metal platform includes a third protrusion and a fourth protrusion that are arranged on both sides of the corresponding common electrode line along a second direction, respectively, where the first direction intersects the second direction.

In some embodiments, the array substrate further includes a plurality of pixel electrodes disposed on the first base substrate; for a pixel electrode closest to the metal platform, an orthographic projection of the pixel electrode on the first base substrate is non-overlapping with an orthographic projection of the metal platform on the first base substrate; and/or the array substrate further includes a plurality of common electrodes disposed on the first base substrate; for a common electrode that is electrically connected to the corresponding common electrode line and closest to the metal platform, an orthographic projection of the common electrode on the first base substrate is non-overlapping with an orthographic projection of the metal platform on the first base substrate.

In some embodiments, the pixel electrode has a notch proximate to the fourth protrusion, and/or the common electrode has a notch proximate to the fourth protrusion.

In some embodiments, the array substrate further includes a plurality of gate lines, disposed on the first base substrate and extending in the first direction. A portion, proximate to the third protrusion, of a gate line adjacent to the corresponding common electrode line includes a depression; and the depression has an opening facing the third protrusion, and a shape of the depression matches a shape of a contour of the third protrusion.

In still another aspect, another display panel includes the array substrate as described in any one of the above embodiments, an opposite substrate, a liquid crystal layer, and a plurality of spacers. The opposite substrate is disposed opposite to the array substrate. The liquid crystal layer is disposed between the array substrate and the opposite substrate. The plurality of spacers are disposed on a side of the opposite substrate proximate to the array substrate. At least one spacer of the plurality of spacers is disposed opposite to the at least one metal platform; and an orthographic projection of an end, proximate to the first base substrate, of each of the at least one spacer on the first base substrate is located within an orthographic projection of a corresponding metal platform of the at least one metal platform on the first base substrate.

In another aspect, a display device is provided. The display device includes the display panel as described in any one of the above embodiments and a backlight module disposed on a side of the display panel.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these accompanying drawings. In addition, the accompanying drawings in the following description may be regarded as schematic diagrams, but are not limitations on an actual size of a product, an actual process of a method and an actual timing of a signal involved in the embodiments of the present disclosure.

DETAILED DESCRIPTION

Figure 1:
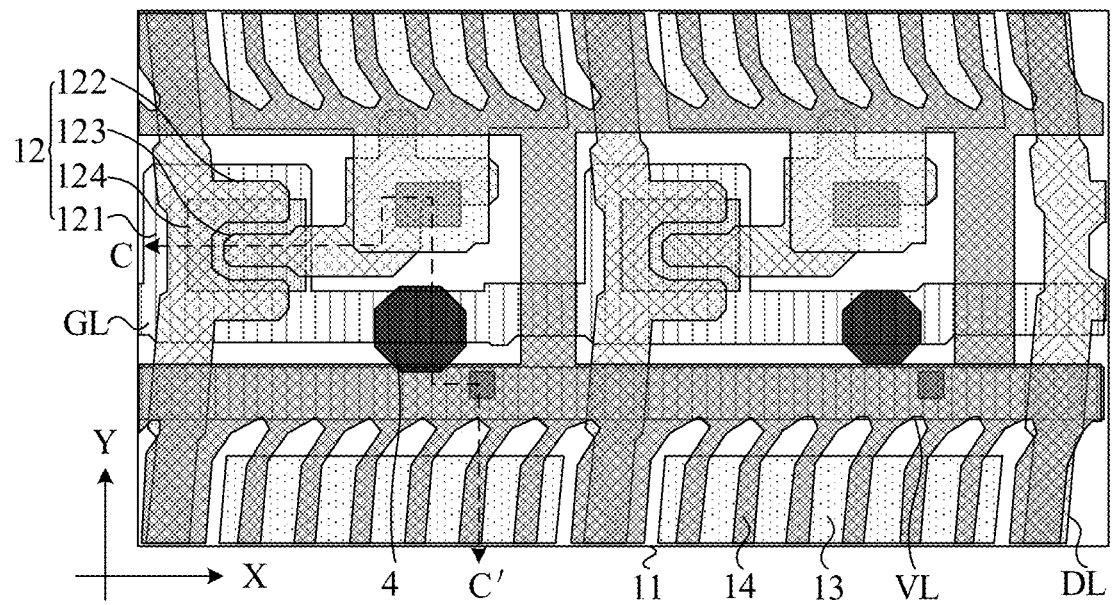
FIG. 1 is a structural diagram of an array substrate and spacers, in accordance with some embodiments of the present disclosure.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representation of the above terms does not necessarily refer to the same embodiment(s) or examples(s). In addition, the specific features, structures, materials or characteristics may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, the features defined with "first" and "second" may explicitly or implicitly include one or more of the features. In the description of the embodiments of the present disclosure, the term "a plurality of/the plurality of" means two or more unless otherwise specified.

Some embodiments may be described using the terms "coupled" and "connected" and their derivatives. For example, the term "connected" may be used in the description of some embodiments to indicate that two or more components are in direct physical or electrical contact with each other. The embodiments disclosed herein are not necessarily limited to the content herein.

The phrase "A and/or B" includes the following three combinations: only A, only B, and a combination of A and B.

As used herein, depending on the context, the term "if" is optionally construed as "when", "in a case where", "in response to determining" or "in response to detecting". Similarly, depending on the context, the phrase "if it is determined" or "if [a stated condition or event] is detected" is optionally construed as "in a case where it is determined", "in response to determining", "in a case where [the stated condition or event] is detected", or "in response to detecting [the stated condition or event]".

The phase "applicable to" or "configured to" as used herein indicates an open and inclusive expression, which does not exclude devices that are applicable to or configured to perform additional tasks or steps.

In addition, the use of the phase "based on" means openness and inclusiveness, since a process, step, calculation or other action that is "based on" one or more of the stated conditions or values may, in practice, be based on additional conditions or values exceeding those stated.

The terms, such as "about", "substantially" or "approximately" as used herein include a stated value and an average value within an acceptable range of deviation of a particular value. The acceptable range of deviation is determined by a person of ordinary skill in the art in view of the measurement in question and the error associated with the measurement of a particular quantity (i.e., the limitations of the measurement system).

Exemplary embodiments are described herein with reference to sectional views and/or plan views as idealized exemplary drawings. In the accompanying drawings, thicknesses of layers and regions are enlarged for clarity. Thus, variations in shape with respect to the accompanying drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown in a rectangular shape generally has a feature of being curved. Therefore, the regions shown in the accompanying drawings are schematic in nature, and their shapes are not intended to show actual shapes of the region in a device, and are not intended to limit the scope of the exemplary embodiments.

Figure 8:
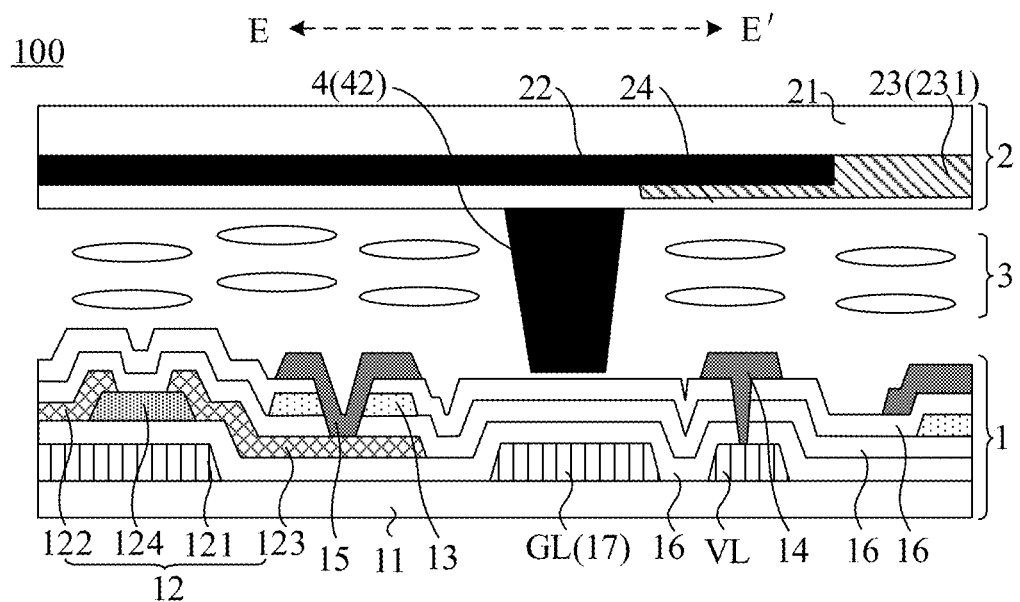
FIG. 8 is a section of the display panel shown in FIG. 7 taken along the direction E-E'.
Figure 9:
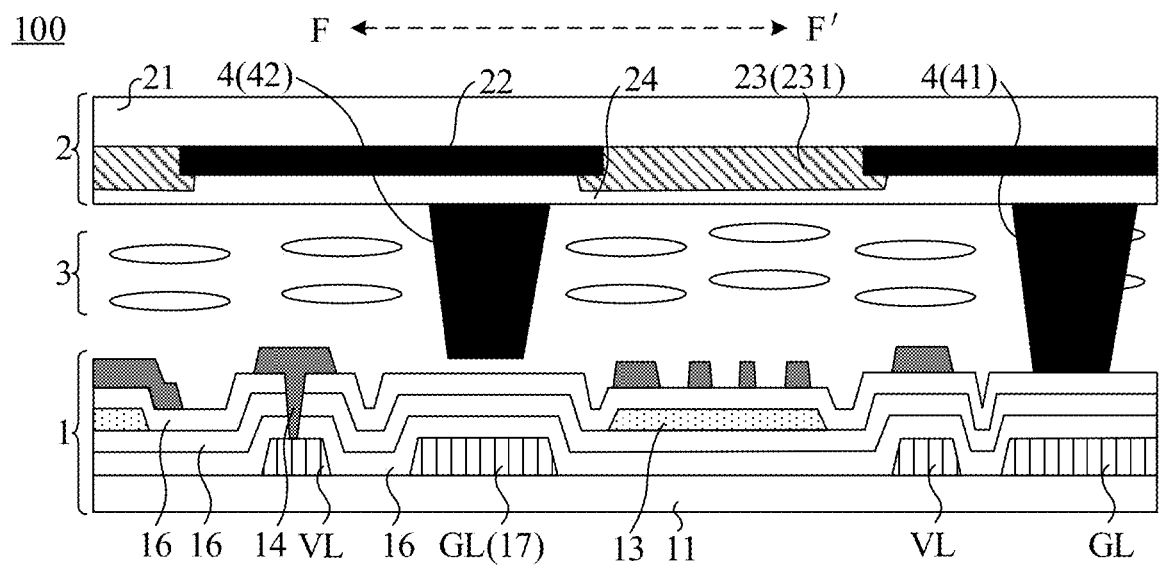
FIG. 9 is a section of the display panel shown in FIG. 7 taken along the direction F-F'.

Some embodiments of the present disclosure provide a display panel 100. As shown in FIGS. 8 and 9, the display panel 100 includes: an array substrate 1 and an opposite substrate 2 that are disposed opposite to each other, a liquid crystal layer 3 disposed between the array substrate 1 and the opposite substrate 2, and a plurality of spacers 4 disposed on a side of the opposite substrate 2 proximate to the array substrate 1.

For example, the opposite substrate 2 may be a color filter substrate or a transparent substrate. For example, the opposite substrate 2 may include a transparent substrate and a black matrix or a color filter layer disposed on a side of the transparent substrate proximate to the array substrate 1. In a case where the opposite substrate 2 includes the black matrix, a color filter layer may be disposed on a side of the array substrate 1 proximate to the opposite substrate 2. In a case where the opposite substrate 2 includes the color filter layer, a black matrix may be disposed on the side of the array substrate 1 proximate to the opposite substrate 2.

Hereinafter, as shown in FIGS. 8 and 9, a structure of the display panel 100 is schematically described by taking an example where the opposite substrate 2 is a color filter substrate and the opposite substrate 2 includes a transparent substrate 21, a black matrix 22, a color filter layer 23 and a protective layer 24.

The transparent substrate 21 may be of various types, which is determined according to actual needs. For example, the transparent substrate 21 (i.e., a blank base substrate) may be a polymethyl methacrylate (PMMA) base substrate or a glass base substrate.

In some embodiments, as shown in FIGS. 8 and 9, the black matrix 22 is disposed on a side of the transparent substrate 21 proximate to the array substrate 1, and the black matrix 22 has a plurality of openings. The color filter layer 23 includes a plurality of color filter portions 231, and at least a portion of each color filter portion 231 is located in an opening. The protective layer 24 is disposed on a side, proximate to the array substrate 1, of the black matrix 22 and the color filter layer 23. In this way, the protective layer 24 may be used to protect the black matrix 22 and the color filter layer 23.

In some examples, as shown in FIGS. 3 to 6, the array substrate 1 includes a substrate (i.e., a first base substrate) 11.

The substrate 11 may be of various types, which is determined according to actual needs.

For example, the substrate 11 may be a blank base substrate. For another example, the substrate 11 may include a blank base substrate and a functional film (e.g., a buffer layer) disposed on a side of the blank base substrate.

The blank base substrate may be of various types, which is determined according to actual needs. For example, the blank base substrate may be a PMMA base substrate or a glass base substrate.

In some embodiments, as shown in FIGS. 3 to 6, the array substrate 1 further includes a plurality of gate lines GL and a plurality of common electrode lines VL that are disposed on a side of the substrate 11 proximate to the opposite substrate 2.

In some examples, the plurality of gate lines GL and the plurality of common electrode lines VL are disposed in a same layer.

It will be noted that, the "same layer" mentioned herein refers to a layer structure formed by forming a film layer for forming a specific pattern through a same film forming process and then performing a single patterning process using a same mask. Depending on different specific patterns, the patterning process may include a plurality of exposure processes, development processes or etching processes, the specific patterns in the formed layer structure may be continuous or discontinuous, and these specific patterns may also be at different heights or have different thicknesses. In this way, the plurality of gate lines GL and the plurality of common electrode lines VL may be formed simultaneously, which is conductive to simplifying processes for manufacturing the array substrate 1 and the display panel 100.

In some examples, the plurality of gate lines GL and the plurality of common electrode lines VL all extend in a first direction X. In this way, it may be possible to prevent the gate lines GL from intersecting the common electrode lines VL, thereby avoiding signal crosstalk.

The plurality of gate lines GL and the plurality of common electrode lines VL may be arranged in various manners, which is determined according to actual needs.

Figure 3:
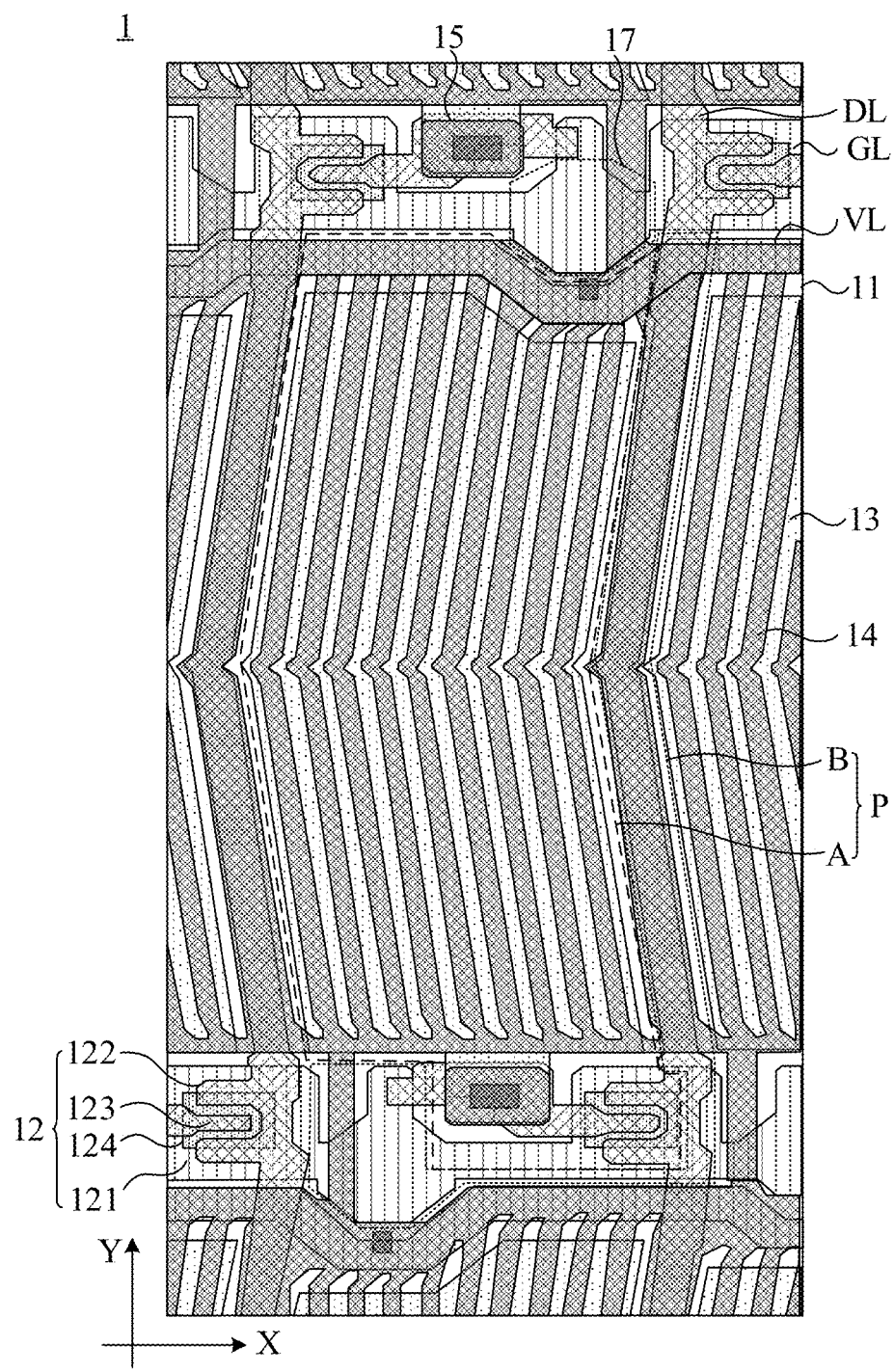
FIG. 3 is a structural diagram of another array substrate, in accordance with some embodiments of the present disclosure.

For example, as shown in FIG. 3, each gate line GL and each common electrode line VL are alternately arranged in sequence. For another example, every several (e.g., two or three) gate lines GL and a single common electrode line VL are arranged alternately in sequence.

Hereinafter, as shown in FIG. 3, a structure of the array substrate 1 and the structure of the display panel 100 are schematically described by taking an example where each gate line GL and each common electrode line VL are arranged alternately in sequence.

Figure 4:
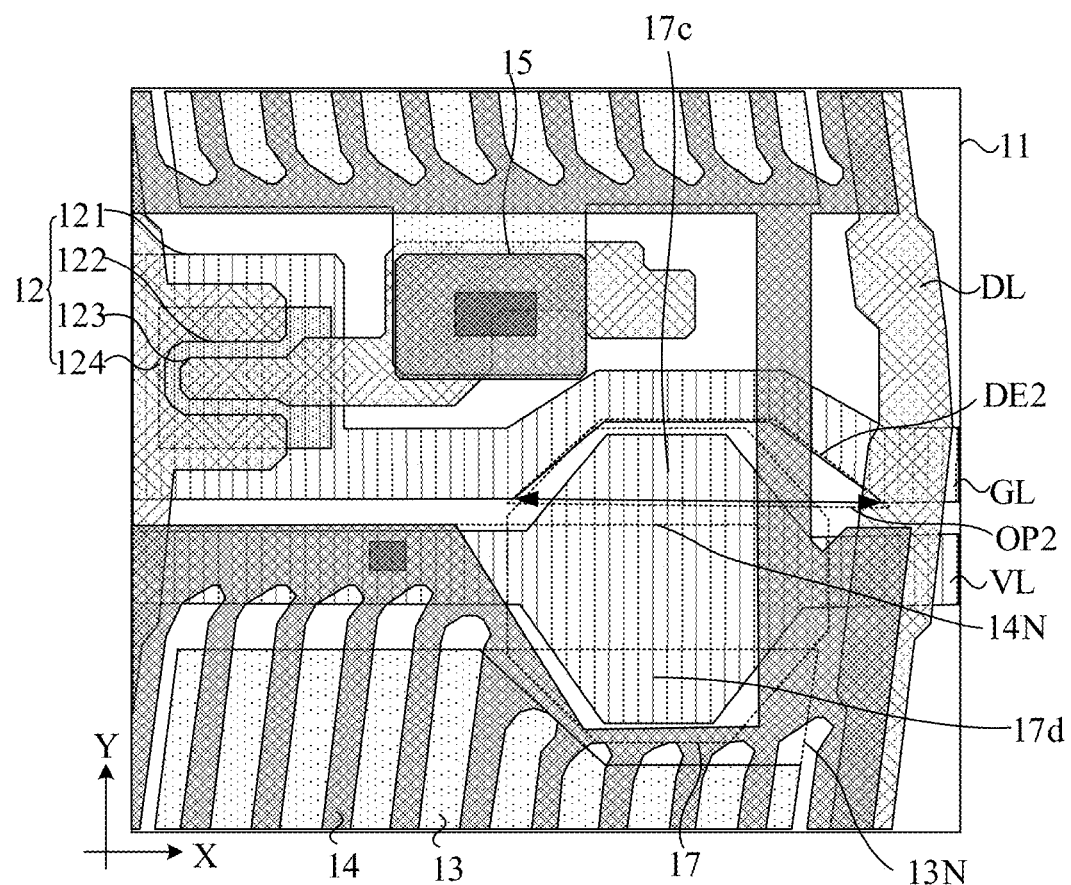
FIG. 4 is a partial enlarged view of the array substrate shown in FIG. 3.
Figure 5:
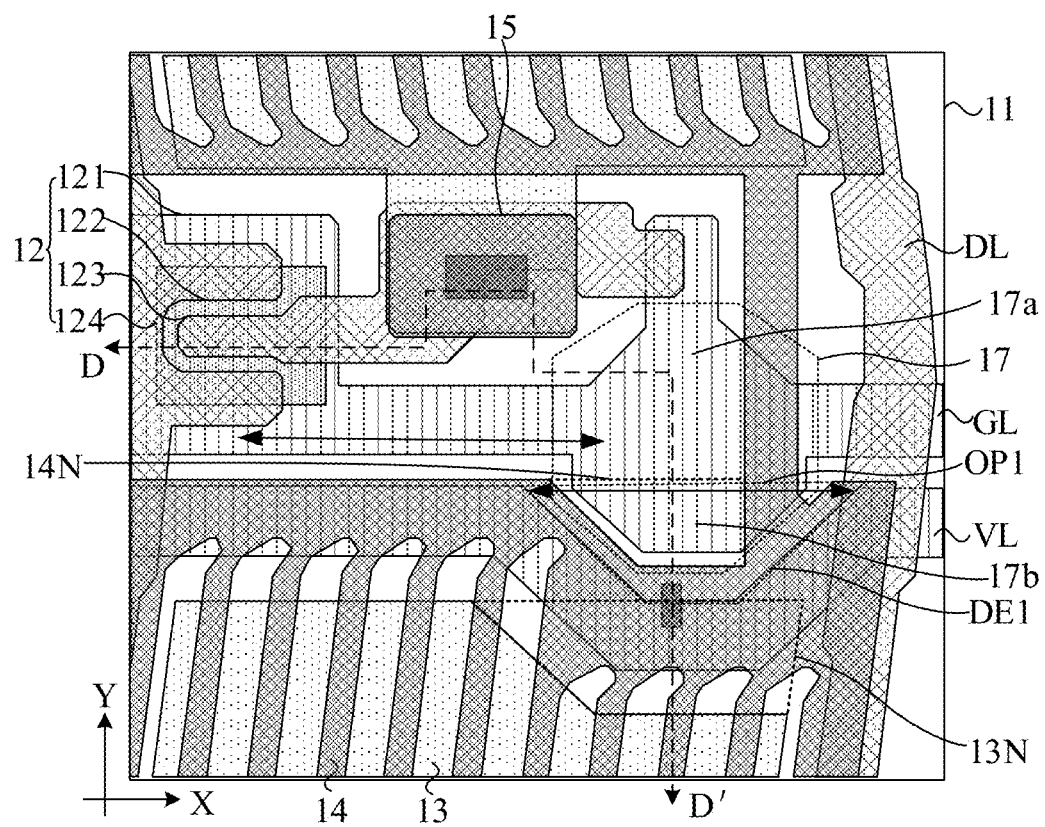
FIG. 5 is another partial enlarged view of the array substrate shown in FIG. 3.

In some embodiments, as shown in FIGS. 3 to 5, the array substrate 1 further includes: a plurality of data lines DL disposed on a side, away from the substrate 11, of the plurality of gate lines GL and the plurality of common electrode lines VL. The plurality of data lines DL extend in a second direction Y.

In some examples, the second direction Y intersects the first direction X.

Here, a magnitude of an included angle between the first direction X and the second direction Y may be determined according to actual needs. For example, the second direction Y and the first direction X may be perpendicular to each other. That is, the included angle between the two is 90°.

In some examples, as shown in FIG. 3, the plurality of data lines DL cross the plurality of gate lines GL to define a plurality of first regions A.

In some embodiments, as shown in FIGS. 3 to 6, the array substrate 1 further includes a plurality of transistors 12 (e.g., the transistors 12 are thin film transistors) disposed on a side of the substrate 11 proximate to the opposite substrate 2. Each transistor 12 includes a gate 121, a source 122 and a drain 123.

Of course, each transistor 12 further includes an active layer 124. The active layer 124 may be disposed on a side of the gate 121 proximate to the substrate 11. In this case, the transistor 12 may be referred to as a top-gate transistor. Alternatively, the active layer 124 may be disposed between the gate 121 and a film where the source 122 and the drain 123 are located. In this case, the transistor 12 may be referred to as a bottom-gate transistor. As shown in FIGS. 3 to 6, the description in embodiments of the present disclosure is made by taking an example where the transistors 12 are bottom-gate transistors.

In some examples, each first region A may be provided with a single transistor 12 therein. As shown in FIG. 3, first regions A arranged in a line in the first direction X may be referred to as first regions A in a same row, and first regions A arranged in a line in the second direction Y may be referred to as first regions A in a same column. For example, transistors 12 in first regions A of a same row may be electrically connected to a single gate line GL, and transistors 12 in first regions A of a same column may be electrically connected to a single data line DL. Each first transistor 12 may be electrically connected to a corresponding gate line GL through the gate 121, and be electrically connected to a corresponding data line DL through one (e.g., the source 122) of the source 122 and the drain 123.

Here, the gate 121 of each transistor 12 may be disposed in a same layer as the plurality of gate lines GL, and the source 122 and the drain 123 of each transistor 12 may be disposed in a same layer as the plurality of data lines DL.

In some examples, as shown in FIG. 3, a positional relationship between the transistors 12 and the gate lines GL and the common electrode lines VL alternately arranged in sequence may be that, each transistor 12 is adjacent to a single gate line GL and a single common electrode line VL, and a single gate line GL and a single common electrode line VL are disposed between two adjacent transistors 12 in the second direction Y.

In some embodiments, as shown in FIGS. 3 to 6, the array substrate 1 further includes: a pixel electrode 13 disposed on a side of each transistor 12 away from the substrate 11 and a common electrode 14 disposed on a side of the pixel electrode 13 away from the substrate 11.

In some examples, as shown in FIGS. 3 to 5, common electrodes 14 in the plurality of first regions A may be electrically connected to each other to form an integral structure, and be electrically connected to corresponding common electrode lines VL.

It will be noted that, the "integrated structure" mentioned herein refers to that, on a basis of the "same layer", the specific patterns in the formed layer structure are continuous and connected to each other.

In some examples, as shown in FIGS. 3 to 5, a pixel electrode 13 is electrically connected to one, which is not electrically connected to the data lines DL, of a source 122 and a drain 123 of a transistor 12. For example, in a case where the transistor 12 is electrically connected to a data line DL through the source 122 thereof, the pixel electrode 13 is electrically connected to the drain 123.

The pixel electrode 13 may be coupled to the transistor 12 in various manners, which is determined according to actual needs.

In some examples, the pixel electrode 13 is directly electrically connected to the transistor 12. That is, the pixel electrode 13 may be in direct contact with one, which is not electrically connected to the data lines DL, of the source 122 and the drain 123 of the transistor 12 through a via hole to form an electrical connection.

In some other examples, as shown in FIGS. 3 to 6, the array substrate 1 further includes: connecting portions 15 disposed in a same layer as the common electrodes 14. The pixel electrode 13 is connected to one, which is not electrically connected to the data lines DL, of the source 122 and the drain of the transistor 12 through a connecting portion 15. The connection portions 15 are electrically insulated from the common electrodes 14. That is, patterns corresponding to the two are disconnected to each other.

By transmitting driving voltages to the pixel electrodes 13 and transmitting a common voltage to the common electrodes 14, electric fields may be generated between the two. The electric fields may drive liquid crystal molecules in the liquid crystal layer 3 to angularly deflect, so that the display panel 100 is capable of performing gray scale display. By providing the connection portions 15 and the common electrodes 14 to be in the same layer, the connection portions 15 and the common electrodes 14 may be formed in a single patterning process, which is conductive to simplifying the processes of manufacturing the array substrate 1 and the display panel 100.

Figure 2:
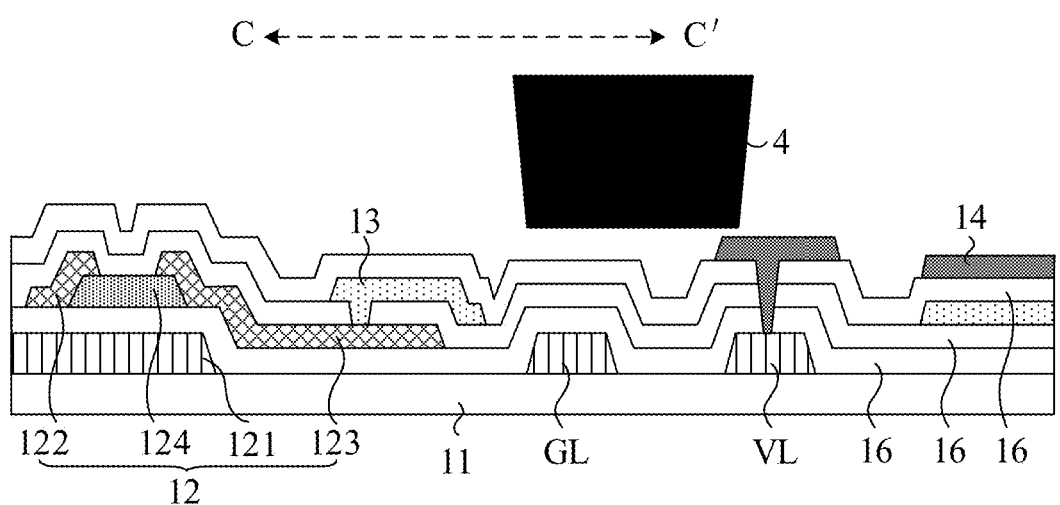
FIG. 2 is a section of the array substrate and the spacer shown in FIG. 1 taken along the direction C-C'.
Figure 6:
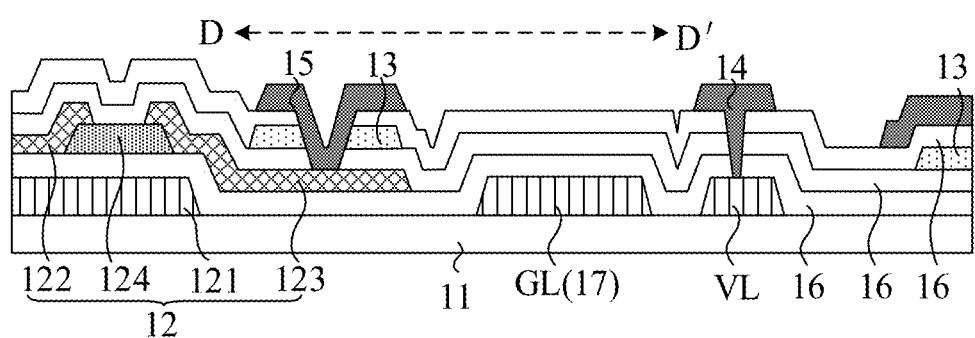
FIG. 6 is a section of the structure shown in FIG. 5 taken along the direction D-D'.

In some embodiments, as shown in FIGS. 2 and 6, the array substrate 1 further includes: an insulating layer 16 disposed between every two adjacent conductive films. For example, a conductive film may be a gate conductive film including gates 121, the gate lines GL and the common electrode lines VL, a source-drain conductive film including sources 122, drains 123 and the data lines GL, a pixel electrode film including the pixel electrodes 13, or a common electrode film including the common electrodes 14 and the connecting portions 15.

In some examples, materials of the insulating layers 16 include an inorganic insulating material. In this way, in a process of forming the array substrate 1, the insulating layers 16 may be formed by a same process (e.g., a deposition process), and there is no need to involve other processes (e.g., in a case where a material of an insulating layer is an organic insulating material, processes such as coating, exposure and development are required), which is conductive to simplifying the process of manufacturing the array substrate 1 and reducing production costs of the array substrate 1.

Here, in a process of forming an insulating layer 16, a morphology of the formed insulating layer 16 is same or substantially same as a morphology of a surface, away from the substrate 11, of a structure covered by the insulating layer 16.

In an implementation, as shown in FIGS. 1 and 2, a portion of an orthographic projection of an end, proximate to the substrate 11, of at least one spacer 4 of the plurality of spacers 4 on the substrate 11 is located between orthographic projections of a gate line GL and a common electrode line VL adjacent to each other on the substrate 11. Consequently, when the display panel 100 is touched or pressed, the at least one spacer 4 is prone to get stuck in a gap between the gate line GL and the common electrode line VL adjacent to each other, which is difficult to recover and causes the at least one spacer to make the opposite substrate 2 deform. When the opposite substrate 2 is deformed, a photoelastic effect will be generated. Thus, in a case where a display state of the display panel 100 is a dark state, a portion of light in the display panel 100 that should not be emitted is prone to exit from a display surface of the display panel 100 through the opposite substrate 2 due to the photoelastic effect, which results in a light leakage problem and then reduces display quality and contrast of the display panel 100.

In light of this, in some embodiments, as shown in FIGS. 3 to 10, the array substrate 1 further includes at least one metal platform 17 disposed on the side of the substrate 11 proximate to the opposite substrate 2.

In some examples, as shown in FIGS. 8 and 9, at least one spacer 4 of the plurality of spacers 4 is disposed opposite to the at least one metal platform 17, and an orthographic projection of an end, proximate to the substrate 11, of the spacer 4 on the substrate 11 is located within an orthographic projection of the metal platform 17 on the substrate 11.

For example, the at least one metal platform 17 and the at least one spacer 4 may be disposed in one-to-one correspondence. That is, a number of the at least one metal platform 17 is equal to a number of the at least one spacer 4, and each metal platform 17 is disposed opposite to a spacer 4. Here, the "disposed opposite to" means that, a surface of each metal platform 17 away from the substrate 11 and a surface of the corresponding spacer 4 proximate to the substrate 11 are disposed in a face-to-face manner.

By setting the orthographic projection of the end, proximate to the substrate 11, of the spacer 4 disposed opposite to the metal platform 17 on the substrate 11 is set to be located within the orthographic projection of the metal platform 17 on the substrate 11, it may be possible to enable the end of the spacer 4 proximate to the substrate 11 to be still disposed opposite to the metal platform 17 and be kept in the gap between the gate line GL and the common electrode line VL adjacent to each other in a case where the spacer 4 is moved or deformed.

Therefore, by providing the metal platform 17 on the side of the substrate 11 proximate to the opposite substrate 2 and setting the orthographic projection of the end, proximate to the substrate 11, of the spacer 4 disposed opposite to the metal platform 17 on the substrate 11 to be located within the orthographic projection of the metal platform 17 on the substrate 11, the display panel 100 provided in some embodiments of the present disclosure may enable the end of the spacer 4 proximate to the substrate 11 to be still disposed opposite to the metal platform 17 in the case where the spacer 4 is moved or deformed, thereby preventing the end of the spacer 4 from getting stuck in the gap between the gate line GL and the common electrode line VL adjacent to each other. In this way, the light leakage problem caused by the spacer 4 stuck in the gap between the gate line GL and the common electrode line VL adjacent to each other may be avoided, which effectively improves the display quality and the contrast of the display panel 100.

It will be noted that, the "the spacer 4 disposed opposite to the metal platform 17" mentioned herein refers to a spacer 4 disposed in one-to-one correspondence with the metal platform 17, an orthographic projection of an end of the spacer 4 proximate to the substrate 11 on the substrate 11 being located within the orthographic projection of the metal platform 17 on the substrate 11.

The orthographic projection of the metal platform 17 on the substrate 11 and the orthographic projection of the end, proximate to the substrate 11, of the spacer 4 disposed opposite to the metal platform 17 on the substrate 11 may be of various shapes, which is determined according to actual needs.

In some embodiments, a shape of the orthographic projection of the metal platform 17 on the substrate 11 is same or substantially same as a shape of the orthographic projection of the end, proximate to the substrate 11, of the spacer 4 disposed opposite to the metal platform 17 on the substrate 11.

In some examples, the shape of the orthographic projection of the metal platform 17 on the substrate 11 is a circle or a polygon. For example, the polygon may be a rectangle, a pentagon, a hexagon or an octagon.

In this case, in a case where the shape of the orthographic projection of the metal platform 17 on the substrate 11 is a circle, the shape of the orthographic projection of the end, proximate to the substrate 11, of the spacer 4 disposed opposite to the metal platform 17 on the substrate 11 may also be a circular. In a case where the shape of the orthographic projection of the metal platform 17 on the substrate 11 is an octagon, the shape of the orthographic projection of the end, proximate to the substrate 11, of the spacer 4 disposed opposite to the metal platform 17 on the substrate 11 may also be an octagon.

By setting the shape of the orthographic projection of the metal platform 17 on the substrate 11 to be the same or substantially the same as the shape of the orthographic projection of the end, proximate to the substrate 11, of the spacer 4 disposed opposite to the metal platform 17 on the substrate 11, it is conductive to preventing a portion of the orthographic projection of the end, proximate to the substrate 11, of the spacer 4 disposed on the substrate 11 from exceeding a border of the orthographic projection of the metal platform 17 on the substrate 11 in the case where the spacer 4 is moved or deformed.

Alternatively, the shape of the orthographic projection of the metal platform 17 on the substrate 11 may be different from the shape of the orthographic projection of the end, proximate to the substrate 11, of the spacer 4 disposed opposite to the metal platform 17 on the substrate 11. For example, the shape of the orthographic projection of the metal platform 17 on the substrate 11 is a circle, and the shape of the orthographic projection of the end, proximate to the substrate 11, of the spacer 4 disposed opposite to the metal platform 17 on the substrate 11 may be an octagon.

It will be noted that, the "substantially the same" herein means that two compared objects may not be strictly the same as each other due to a process error.

Figures 10, 11:
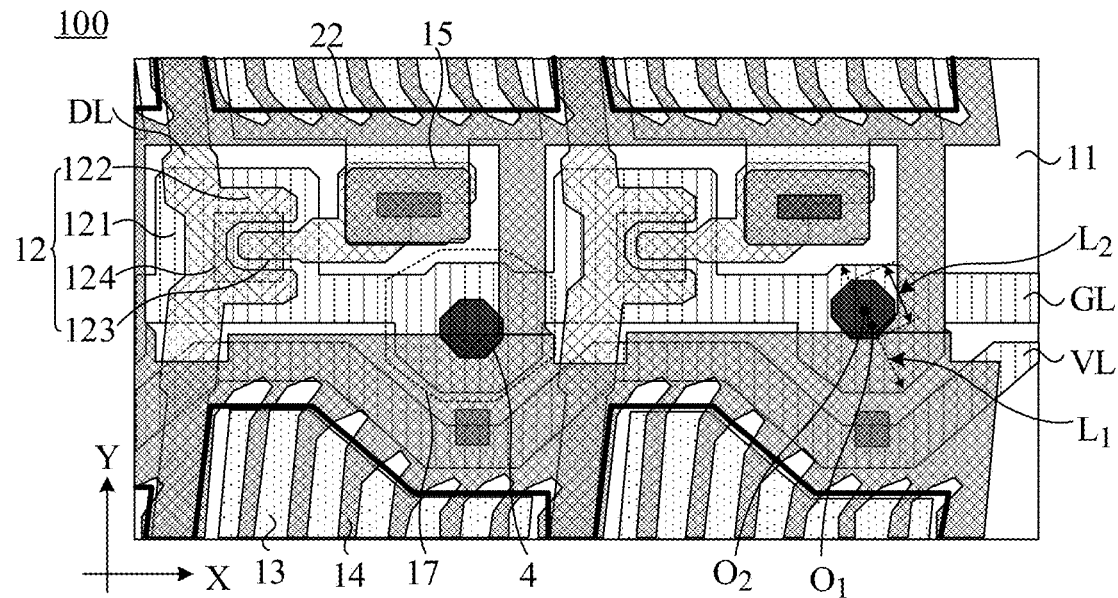
FIG. 10 is a structural diagram of another display panel, in accordance with some embodiments of the present disclosure.
FIG. 11 is a structural diagram of yet another display panel, in accordance with some embodiments of the present disclosure.

In some embodiments, as shown in FIGS. 8 to 10, a minimum distance between the border of the orthographic projection of the metal platform 17 on the substrate 11 and a border of the orthographic projection of the end, proximate to the substrate 11, of the spacer 4 disposed opposite to the metal platform 17 on the substrate 11 is greater than zero.

That is, the orthographic projection of the end of the spacer 4 proximate to the substrate 11 on the substrate 11 is located within the orthographic projection of the metal platform 17 on the substrate 11, and there is no overlap between the two borders. In this way, the end of the spacer 4 proximate to the substrate 11 may be opposite to a middle portion of the metal platform 17. Therefore, it is conductive to ensuring that the orthographic projection of the end of the spacer 4 proximate to the substrate 11 on the substrate 11 is still located within the orthographic projection of the metal platform 17 on the substrate 11 in a case where the spacer 4 is moved or deformed in any direction parallel to the substrate 11, which further avoids a problem that the spacer 4 gets stuck in the gap between the gate line GL and the common electrode line VL adjacent to each other, and then effectively improves the display quality and the contrast of the display panel 100.

In some examples, minimum distances, in different directions parallel to the substrate 11, between the border of the orthographic projection of the metal platform 17 on the substrate 11 and the border of the orthographic projection of the end, proximate to the substrate 11, of the spacer 4 disposed opposite to the metal platform 17 on the substrate 11 are same as each other.

In this way, it may be possible to make a center line of the metal platform 17 coincide with an axis of the spacer 4, so that the end of the spacer 4 proximate to the substrate 11 is directly opposite to the middle portion of the metal platform 17. Therefore, it is conductive to further ensuring that the orthographic projection of the end of the spacer 4 proximate to the substrate 11 on the substrate 11 is still located within the orthographic projection of the metal platform 17 on the substrate 11 in the case where the spacer 4 is moved or deformed in any direction parallel to the substrate 11, and avoiding a problem that the spacer 4 gets stuck in the gap between the gate line GL and the common electrode line VL adjacent to each other, which effectively improves the display quality and the contrast of the display panel 100.

Here, sizes of the metal platform 17 and the spacer 4 disposed opposite to the metal platform 17 may be set in various manners, which is determined according to actual needs.

In some examples, a ratio of an area of the orthographic projection of the metal platform 17 on the substrate 11 to an area of the orthographic projection of the end, proximate to the substrate 11, of the spacer 4 disposed opposite to the metal platform 17 on the substrate 11 is in a range of 4:1 to 5:1, inclusive.

By setting the proportional relationship between the area of the orthographic projection of the metal platform 17 on the substrate 11 and the area of the orthographic projection of the end, proximate to the substrate 11, of the spacer 4 disposed opposite to the metal platform 17 on the substrate 11, it may be possible to enable the end of the spacer 4 proximate to the substrate 11 to be opposite to the middle portion of the metal platform 17, and enable the border of the orthographic projection of the end of the spacer 4 proximate to the substrate 11 on the substrate 11 to be at a certain distance from the border of the orthographic projection of the metal platform 17 on the substrate 11, so that the orthographic projection of the end of the spacer 4 proximate to the substrate 11 on the substrate 11 is still located within the orthographic projection of the metal platform 17 on the substrate 11 in the case where the spacer 4 is moved or deformed, which avoids the problem that the spacer 4 gets stuck in the gap between the gate line GL and the common electrode line VL adjacent to each other.

In some other examples, as shown in FIG. 10, in a same direction, for the orthographic projection of the metal platform 17 on the substrate 11, a dimension passing through a geometric center of gravity $O_1$ thereof (i.e., of the orthographic projection of the metal platform 17 on the substrate 11) is a first dimension $L_1$; and for the orthographic projection of the end, proximate to the substrate 11, of the spacer 4 disposed opposite to the metal platform 17 on the substrate 11, a dimension passing a geometric center of gravity $O_2$ thereof (i.e., of the orthographic projection of the end, proximate to the substrate 11, of the spacer 4 disposed opposite to the metal platform 17 on the substrate 11) is a second dimension $L_2$. The first dimension $L_1$ is greater than or equal to a sum of the second dimension $L_2$ and a fitting allowance of the array substrate 1 and the opposite substrate 2.

Here, considering the orthographic projection of the metal platform 17 on the substrate 11 as an example, in a case where the shape of the orthographic projection of the metal platform 17 on the substrate 11 is a circle, the geometric center of gravity $O_1$ thereof is a center of the circle; in a case where the shape of the orthographic projection of the metal platform 17 on the substrate 11 is a rectangle, a regular pentagon, a regular hexagon or a regular octagon, the geometric center of gravity $O_1$ thereof is a geometric center thereof; and in a case where the shape of the orthographic projection of the metal platform 17 on the substrate 11 is an arbitrary polygon, the arbitrary polygon may be divided into a plurality of different triangles or quadrilaterals, and an intersection point of connection lines of geometric centers of gravity of the plurality of triangles or quadrilaterals is the geometric center of gravity $O_1$ of the arbitrary polygon. The first dimension $L_1$ refers to a distance between two points where the longest straight line passing through the geometric center $O_1$ of gravity of the orthographic projection of the metal platform 17 on the substrate 11 intersects the border of the orthographic projection of the metal platform 17 on the substrate 11.

As for the geometric center of gravity $O_2$ and the second dimension $L_2$ of the orthographic projection of the end, proximate to the substrate 11, of the spacer 4 disposed opposite to the metal platform 17 on the substrate 11, reference may be made to the above description of the orthographic projection of the metal platform 17 on the substrate 11.

In a process of assembling the array substrate 1 and the opposite substrate 2 in an opposing setting to form the display panel 100, there is the fitting allowance (i.e., an assembly error) between the array substrate 1 and the opposite substrate 2. In a case where relative positions of the array substrate 1 and the opposite substrate 2 fluctuate in a range of the fitting allowance, relative positions of the plurality of spacers 4 disposed on the side of the opposite substrate 2 proximate to the array substrate 1 and the array substrate 1 will also fluctuate in a same or substantially same range.

By setting the relationship between the dimension (i.e., the first dimension) of the metal platform 17, the dimension (i.e., the second dimension) of the end, proximate to the substrate 11, of the spacer 4 disposed opposite to the metal platform 17 and the fitting allowance, it may be possible to make the orthographic projection of the end of the spacer 4 proximate to the substrate 11 on the substrate 11 still located within the orthographic projection of the metal platform 17 on the substrate 11 in a case where the relative positions of the array substrate 1 and the opposite substrate 2 fluctuate in the range of the fitting allowance, which is further conductive to avoiding the problem that the spacer 4 gets stuck in the gap between the gate line GL and the common electrode line VL adjacent to each other due to a movement or deformation of the spacer 4.

For example, the first dimension $L_1$ is greater than or equal to 1.43 times to 2.8 times the second dimension $L_2$, inclusive.

In this way, it may be possible to avoid a situation that the orthographic projection of the spacer 4 on the substrate 11 is difficult to completely fall within the orthographic projection of the metal platform 17 opposite to the spacer 4 on the substrate 11 due to a small dimension of the metal platform 17, and thus avoid a problem of poor display of the display panel 100 caused by such a situation. In addition, under a premise of ensuring that the orthographic projection of the spacer 4 on the substrate 11 completely falls into the orthographic projection of the metal platform 17 opposite to the spacer 4 on the substrate 11, a space ratio of the metal platform 17 may also be reduced to ensure a aperture rate of the display panel 100.

For example, the second dimension $L_2$ is in a range of 10 µm to 14 µm, inclusive; and the fitting allowance is in a range of 5 µm to 7 µm, inclusive.

It will be noted that, the fitting allowance is based on a case where the geometric center $O_1$ of gravity of the orthographic projection of the metal platform 17 on the substrate 11 coincides with the geometric center $O_2$ of gravity of the orthographic projection of the spacer 4 disposed opposite to the metal platform 17 on the substrate 11. That is, on the basis that the geometric center $O_1$ of gravity of the orthographic projection of the metal platform 17 on the substrate 11 coincides with the geometric center $O_2$ of gravity of the orthographic projection of the spacer 4 disposed opposite to the metal platform 17 on the substrate 11, the spacer 4 may fluctuate in any direction parallel to the substrate 11 by 5 µm to 7 µm, inclusive.

Based on this, the first dimension $L_1$ may be greater than or equal to a preset value, and the preset value is the sum of the second dimension $L_2$ and the fitting allowance. Here, the preset value may be in a range of 20 µm to 28 µm, inclusive.

For example, the second dimension $L_2$ may be 10 µm, 10.6 µm, 11 µm, 12 µm, 12.9 µm, 14 µm, or the like. The fitting allowance may be 5 µm, 5.3 µm, 6 µm, 6.7 µm, 7 µm, or the like. The first dimension $L_1$ may be 20 µm, 21 µm, 23 µm, 25.8 µm, 27 µm or 28 µm.

It will be noted that, the metal platform 17 may be disposed in the array substrate 1 in various manners, which is determined according to actual needs.

In some embodiments, as shown in FIGS. 4 and 5, a material of each metal platform 17 is same as a material of a single gate line GL, and the metal platform 17 is integrated with the single gate line GL; or the material of each metal platform 17 is same as a material of a single common electrode line VL, and the metal platform 17 is integrated with the single common electrode line VL.

As shown in FIG. 5, the metal platform 17 includes a first protrusion 17a and a second protrusion 17b that are arranged on both sides of a corresponding gate line GL along the second direction Y, respectively.

As shown in FIG. 5, for a pixel electrode 13 closest to the metal platform 17, the pixel electrode 13 has a notch 13N proximate to the second protrusion 17b; and/or for a common electrode 14 closest to the metal platform 17, the common electrode 14 has a notch 14N proximate to the second protrusion 17b.

Alternatively, as shown in FIG. 4, the metal platform 17 includes a third protrusion 17c and a fourth protrusion 17d that are arranged on both sides of a corresponding common electrode line VL along the second direction Y, respectively.

As shown in FIG. 4, for a pixel electrode 13 closest to the metal platform 17, the pixel electrode 13 has a notch 13N proximate to the fourth protrusion 17d; and/or for a common electrode 14 closest to the metal platform 17, the common electrode 14 has a notch 14N proximate to the fourth protrusion 17d.

By using such a design, the metal platform 17, the gate line GL and the common electrode line VL may be formed in a single patterning process without an additional process for forming the metal platform 17. In this way, it is conductive to simplifying the processes for manufacturing the array substrate 1 and the display panel 100, and preventing thicknesses of the array substrate 1 and the display panel 100 from being increased. Moreover, compared with providing the metal platform 17 as an individual structure, it is may also conductive to reducing an area occupied by the metal platform 17, the gate line GL and the common electrode line VL in the array substrate 1 and a space ratio of the three, so that a large space is provided to structures such as the transistors 12 and the pixel electrodes 13, which ensures the aperture ratio of the display panel 100.

In some examples, as shown in FIG. 5, in a case where the display panel 100 includes a plurality of metal platforms 17, a material of the plurality of metal platforms 17 is same as a material of at least one gate line GL, and the plurality of metal platforms 17 are integrated with the at least one gate line GL.

Here, the plurality of metal platforms 17 and the at least one gate line GL may be disposed in various manners.

For example, the plurality of metal platforms 17 may be integrated with a single gate line GL.

For another example, some metal platforms 17 of the plurality of metal platforms 17 are integrated with a single gate line GL, and some other metal platforms 17 are integrated with some other gate line(s) GL.

For yet another example, the plurality of metal platforms 17 are in one-to-one correspondence with the plurality of gate lines GL, and each metal platform 17 is integrated with a single gate line GL.

In some other examples, as shown in FIG. 4, in the case where the display panel 100 includes the plurality of metal platforms 17, the material of the plurality of metal platforms 17 is same as a material of at least one common electrode line VL, and the plurality of metal platforms 17 are integrated with the at least one common electrode VL.

Here, the plurality of metal platforms 17 and the at least one common electrode line VL may disposed in various manners.

For example, the plurality of metal platforms 17 may be integrated with a single common electrode line VL.

For another example, some metal platforms 17 of the plurality of metal platforms 17 are integrated with a single common electrode line VL, and some other metal platforms 17 are integrated with some other common electrode line(s) VL.

For yet another example, the plurality of metal platforms 17 are in one-to-one correspondence with the plurality of common electrode lines VL, and each metal platform 17 is integrated with a single common electrode line VL.

In yet some other examples, in the case where the display panel 100 includes the plurality of metal platforms 17, a material of some metal platforms 17 of the plurality of metal platforms 17 are same as a material of at least one gate line GL, and the some metal platforms 17 are integrated with the at least one gate line GL; and a material of some other metal platforms 17 of the plurality of metal platforms 17 are same as a material of at least one common electrode line VL, and the some other metal platforms 17 are integrated with the at least one common electrode line VL.

Here, the plurality of metal platforms 17, the at least one gate line GL and the at least one common electrode line VL may disposed in various manners.

For example, some metal platforms 17 of the plurality of metal platforms 17 may be integrated with a single gate line GL, and some other metal platforms 17 may be integrated with a single common electrode line VL.

For another example, some metal platforms 17 of the plurality of metal platforms 17 may be integrated with a single gate line GL, and some other metal platforms 17 may be integrated with a plurality of common electrode lines VL. Here, the some other metal platforms 17 may be disposed in one-to-one correspondence with the plurality of common electrode lines VL.

For yet another example, some metal platforms 17 of the plurality of metal platforms 17 may be integrated with a single common electrode line VL, and some other metal platforms 17 may be integrated with a plurality of gate lines GL. Here, the some other metal platforms 17 may be disposed in one-to-one correspondence with the plurality of gate lines GL.

Of course, the plurality of metal platforms 17, the at least one gate line GL and the at least one common electrode line VL may be disposed in some other manners, which is not limited to the three manners described in the present disclosure.

In some embodiments, as shown in FIGS. 3 and 5, the gate line GL and the common electrode line VL are arranged adjacent to each other. As shown in FIGS. 3 and 5, in a case where the material of each metal platform 17 is the same as the material of the single gate line GL, and the metal platform 17 is integrated with the single gate line GL, of the common electrode line VL adjacent to the gate line GL, a portion, proximate to the metal platform 17, includes a depression DE1 whose opening OP1 faces the metal platform 17, and a shape of the depression matches a contour, proximate to the depression, of the metal platform 17. As shown in FIG. 4, in a case where the material of each metal platform 17 is the same as the material of the single common electrode line VL, and the metal platform 17 is integrated with the single common electrode line VL, of the gate line GL adjacent to the common electrode line VL, a portion, proximate to the metal platform 17, includes a depression DE2 whose opening OP2 faces the metal platform 17, and a shape of the depression matches a contour, proximate to the depression, of the metal platform 17.

That is to say, as shown in FIGS. 3 and 5, in a case where the material of each metal platform 17 is the same as the material of the single gate line GL, and the metal platform 17 is integrated with the single gate line GL, of the common electrode line VL adjacent to the gate line GL, a wiring shape of the common electrode line VL changes as shapes of borders, proximate to the common electrode line VL, of the gate line GL adjacent thereto and the metal platform 17 integrated with the gate line GL change. As shown in FIG. 4, in a case where the material of each metal platform 17 is the same as the material of the single common electrode line VL, and the metal platform 17 is integrated with the single common electrode line VL, of the gate line GL adjacent to the common electrode line VL, a wiring shape of the gate line GL changes as a shape of borders, proximate to the gate line GL, of the common electrode line VL adjacent thereto and the metal platform 17 integrated with the common electrode line VL change.

For example, the metal platform 17 is integrated with the gate line GL, and the orthographic projection of the metal platform 17 on the substrate 11 is in a shape of a circle. In this case, the portion, proximate to the metal platform 17, of the common electrode line VL adjacent to the gate line GL is in a shape of an arc.

For example, the metal platform 17 is integrated with the gate line GL, and the orthographic projection of the metal platform 17 on the substrate 11 is in a shape of an octagon. In this case, the portion, proximate to the metal platform 17, of the common electrode line VL adjacent to the gate line GL may be in a shape of a broken line.

In this way, it is conductive to reducing a distance between the gate line GL and the common electrode line VL, and then reduce the area occupied by the metal platform(s) 17, the gate lines GL and the common electrode lines VL in the array substrate 1 and the space ratio of the three. Therefore, a large space is provided to the structures such as the transistors 12 and the pixel electrodes 13, which ensures the aperture ratio of the display panel 100.

In some examples, as shown in FIGS. 3 to 5, a distance between a border, proximate to the metal platform 17, of the depression and a border, proximate to the depression, of the metal platform 17 is constant or substantially constant.

In this way, under a premise of ensuring that no electrical connection is generated between the depression and the metal platform 17, an area occupied by the depression and the metal platform 17 in the array substrate 1 may be effectively reduced.

In some examples, considering an example where the metal platform 17 is integrated with the gate line GL, a distance between a border of a portion, proximate to the gate line GL, of the common electrode line VL other than the depression and a border of the gate line GL proximate to the common electrode line VL is equal to or substantially equal to the distance between the border of the depression proximate to the metal platform 17 and the border of the metal platform 17 proximate to the depression.

In this way, it is conductive to further reducing the area occupied by the metal platform(s) 17, the gate lines GL and the common electrode lines VL in the array substrate 1, which ensures the aperture ratio of the display panel 100.

In some embodiments, as shown in FIGS. 3 to 5, a position of the metal platform 17 in the array substrate 1 may be set as follows. The metal platform 17 is located between two adjacent data lines DL, and the orthographic projection of the metal platform 17 on the substrate 11 is non-overlapping with orthographic projections of the plurality of data lines DL on the substrate 11. In the second direction Y, a dimension of the metal platform 17 is greater than a dimension of the gate line GL.

By adopting such a design, it is possible to avoid an overlapping area of the data line DL and the metal platform 17, and then prevent a parasitic capacitance, which affects signal transmission of the data line DL and the gate line GL, from being generated between the data line DL and the metal platform 17.

Moreover, the design that the metal platform 17 is disposed between the two adjacent data lines DL means that, the orthographic projection of the end, proximate to the substrate 11, of the spacer 4 disposed opposite to the metal platform 17 on the substrate 11 is also located between the two adjacent data lines DL. In this way, in a process of pressing the display panel 100, a pressure on the data lines DL due to the spacer 4 may be avoided, which avoids adverse effects on insulation between the data lines DL and a conductive film (e.g., the gate conductive film) located below the data lines DL.

In some embodiments, the plurality of spacers 4 included in the display panel 100 may be of various types.

Figure 7:
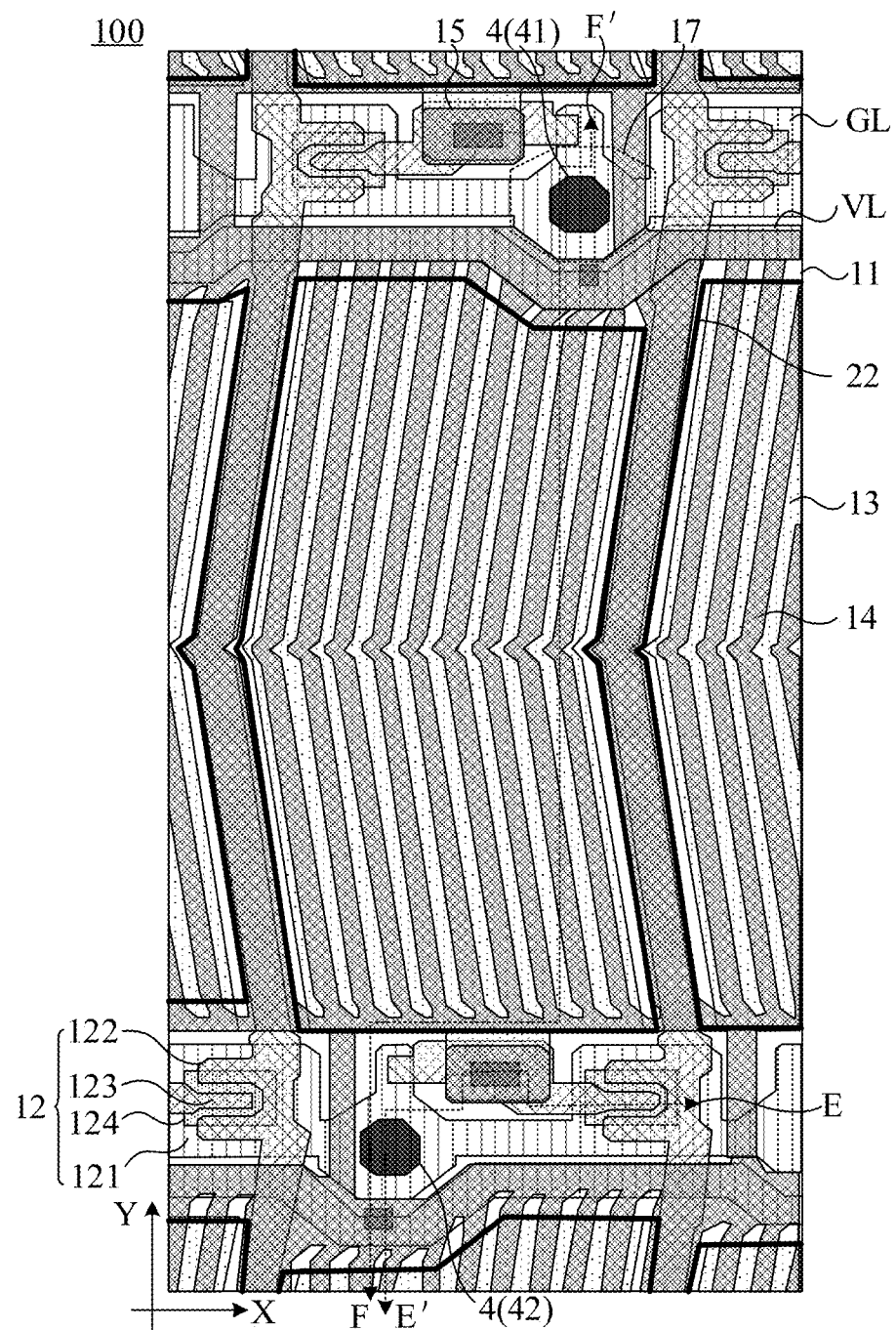
FIG. 7 is a structural diagram of a display panel, in accordance with some embodiments of the present disclosure.

In some examples, as shown in FIGS. 7 and 9, the plurality of spacers 4 includes a plurality of first spacers 41 and at least one second spacer 42. As shown in FIG. 9, in a direction perpendicular to the substrate 11, a dimension of each first spacer 41 is greater than a dimension of each second spacer 42. In this case, the first spacer 41 may be referred to as a main spacer, and the second spacer 42 may be referred to as an auxiliary spacer.

As shown in FIG. 9, after the array substrate 1 and the opposite substrate 2 are assembled in an opposing setting to form a cell, the first spacer 41 abuts against the array substrate 1 (e.g., the first spacer 41 is opposite to a metal platform 17 in the array substrate 1), and produces a certain amount of compression. The first spacer 41 is in a compressed state, and plays a major role in keeping a gap of the cell. The second spacer 42 is disposed opposite to another metal platform 17 in the array substrate 1, and there is a certain distance between the second spacer 42 and a surface of the array substrate 1 proximate to the second spacer 42, so that no compression exists. In a case where the display panel 100 is pressed, the second spacer 42 is compressed. In this case, the second spacer 42 plays an auxiliary role in keeping the gap of the cell.

By providing the second spacer 42 to be opposite to the metal platform 17, it may be possible to prevent the second spacer 42 from getting stuck in the gap between the gate line GL and the common electrode line VL adjacent to each other in the process of pressing the display panel 100. In this way, the light leakage problem caused by the second spacer 42 stuck in the gap between the gate line GL and the common electrode line VL adjacent to each other may be avoided, which effectively improves the display quality and the contrast of the display panel 100.

In some examples, the first spacers 41 and the second spacer 42 are evenly distributed. In this way, it is conductive to ensuring that the first spacers 41 and the second spacer 42 may play a good supporting role, which ensures a uniform cell gap of the display panel 100.

Positions of the plurality of spacers 4 may be various, which is determined according to actual needs.

In some embodiments, as shown in FIG. 11, the display panel 100 has a plurality of sub-pixel regions P. As shown in FIG. 3, each sub-pixel region P includes a first region A defined by gate lines GL and data lines DL and a second region B occupied by portions of a gate line GL and a data line DL that are electrically connected to the transistor 12 in the first region A and pass by the first region A. In this case, the metal platform 17 is located in a corresponding sub-pixel region P.

In some examples, the plurality of spacers 4 are respectively disposed in at least some sub-pixel regions P of the plurality of sub-pixel regions P.

For example, a number of the sub-pixel regions P is greater than a number of the spacers 4. In this case, the plurality of spacers 4 may be disposed in one-to-one correspondence with the some sub-pixel regions P of the plurality of sub-pixel regions P.

For example, the number of the sub-pixel regions P is equal to the number of the spacers 4. In this case, the plurality of the spacers 4 may be disposed in one-to-one correspondence with the plurality of sub-pixel regions P. In this way, it is conductive to improving uniformity of the display panel 100.

In some embodiments, the plurality of sub-pixel regions P include sub-pixel regions of a plurality of colors. For example, the plurality of colors are three primary colors. For example, the three primary colors may be red, green and blue, or may be magenta, yellow and cyan.

The following description is made by considering an example where the three primary colors are red, green and blue. That is, as shown in FIG. 11, the plurality of sub-pixel regions P include a plurality of red sub-pixel regions R, a plurality of green sub-pixel regions G and a plurality of blue sub-pixel regions B.

In some examples, with continued reference to FIG. 11, in a case where the plurality of spacers 4 include the plurality of first spacers 41 and the at least one second spacer 42, the plurality of first spacers 41 are respectively disposed in at least some blue sub-pixel regions B of the plurality of blue sub-pixel regions B.

For example, a number of the blue sub-pixel regions B is greater than a number of the first spacers 41. In this case, the plurality of first spacers 41 may be disposed in one-to-one correspondence with some blue sub-pixel regions B of the plurality of blue sub-pixel regions B. In this case, the some blue sub-pixel regions B may not be provided with any metal platform 17 therein.

For example, the number of the blue sub-pixel regions B is equal to the number of the first spacers 41. In this case, the plurality of first spacers 41 may be disposed in one-to-one correspondence with the plurality of blue sub-pixel regions B. In this case, the plurality of blue sub-pixel regions B may not be provided with any metal platform 17 therein.

In some examples, the at least one second spacer 42 is disposed in remaining sub-pixel region(s) P, i.e., in the sub-pixel region(s) P other than the sub-pixel regions P in which the first spacers 41 are disposed.

By using such a design, an influence on transmittance of the display panel 100 may be alleviated.

Figure 12:
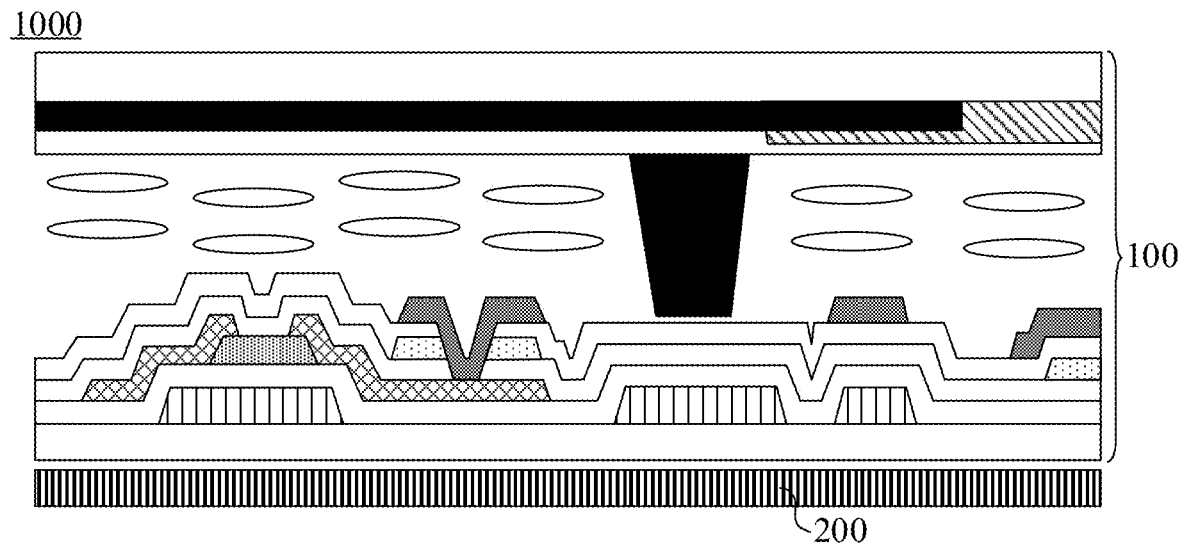
FIG. 12 is a structural diagram of a display device, in accordance with some embodiments of the present disclosure.
Figure 13:
FIG. 13 is a structural diagram of another display device, in accordance with some embodiments of the present disclosure.

Some embodiments of the present disclosure provide a display device 1000. As shown in FIGS. 12 and 13, the display device 1000 includes the display panel 100 described in any one of the above embodiments.

In some examples, as shown in FIG. 12, the display device 1000 further includes a backlight module 200 disposed on a side of the display panel 100. The backlight module 200 can provide the display panel 100 with light required for display. For example, the backlight module is disposed on a side of the array substrate 1 away from the opposite substrate 2.

The substrate 200 may be of various types, which is determined according to actual needs.

For example, the backlight module 200 may be a side-type backlight module. For another example, the backlight module 200 may be a direct type backlight module.

Beneficial effects that may be achieved by the display device 1000 provided in some embodiments of the present disclosure are the same as the beneficial effects that can be achieved by the display panel 200 provided in some embodiments described above, which will not be repeated here.

The display device 1000 may be any device that displays images whether in motion (e.g., videos) or stationary (e.g., still images) and whether text or images. More specifically, it is anticipated that the embodiments may be implemented in a variety of electronic devices or associated with a variety of electronic devices. The variety of electronic devices include (but are not limited to) a mobile phone, a wireless device, a personal digital assistant (PDA), a hand-held or portable computer, a global positioning system (GPS) receiver/navigator, a camera, an moving picture experts group 4 (MP4) video player, a video camera, a game console, a watch, a clock, a calculator, a television monitor, a computer monitor, an automobile display (e.g., an odometer display), a navigator, a cockpit controller and/or display, a display of camera views (e.g., a display of a rear-view camera in a vehicle), an electronic photo, an electronic billboard or sign, a projector, a building structure, a packaging and aesthetic structure (e.g., a display for displaying an image of a piece of jewelry), etc.

The foregoing descriptions are merely specific implementations of the present disclosure. However, the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. An array substrate, comprising:
a first base substrate;
a plurality of gate lines, disposed on the first base substrate and extending in a first direction;
at least one metal platform, disposed on the first base substrate, wherein a metal platform of the at least one metal platform is integrated with a corresponding gate line of the plurality of gate lines, and the metal platform includes a first protrusion and a second protrusion that are arranged on both sides of the corresponding gate line along a second direction, respectively, the first direction intersecting the second direction; and
a plurality of common electrode lines, disposed on the first base substrate and extending in the first direction, wherein
the at least one metal platform includes a plurality of metal platforms, wherein at least one of the plurality of metal platforms is integrated with the corresponding gate line, and another at least one of the plurality of metal platforms is integrated with a corresponding common electrode line of the plurality of common electrode lines.

2. The array substrate according to claim 1, further comprising a plurality of pixel electrodes disposed on the first base substrate, wherein
for a pixel electrode closest to the metal platform, an orthographic projection of the pixel electrode on the first base substrate is non-overlapping with an orthographic projection of the metal platform on the first base substrate; and/or
further comprising a plurality of common electrodes disposed on the first base substrate, wherein
for a common electrode closest to the metal platform, an orthographic projection of the common electrode on the first base substrate is non-overlapping with an orthographic projection of the metal platform on the first base substrate.

3. The array substrate according to claim 2, wherein the pixel electrode has a notch proximate to the second protrusion, and/or the common electrode has a notch proximate to the second protrusion.

4. The array substrate according to claim 1, wherein
a portion, proximate to the second protrusion, of a common electrode line adjacent to the corresponding gate line includes a depression; and the depression has an opening facing the second protrusion, and a shape of the depression matches a shape of a contour of the second protrusion.

5. The array substrate according to claim 4, wherein a distance between a border, proximate to the second protrusion, of the depression and a border, proximate to the depression, of the second protrusion is substantially constant.

6. The array substrate according to claim 1, wherein a shape of an orthographic projection of the metal platform on the first base substrate is a circle or a polygon.

7. The array substrate according to claim 1, further comprising a plurality of data lines, disposed on a side, away from the first base substrate, of the plurality of gate lines and extending in the second direction, wherein
the metal platform is located between two adjacent data lines; and an orthographic projection of the metal platform on the first base substrate is non-overlapping with orthographic projections of the plurality of data lines on the first base substrate.

8. A display panel, comprising:
an array substrate; wherein the array substrate, comprises:
a first base substrate;
a plurality of gate lines, disposed on the first base substrate and extending in a first direction; and
at least one metal platform, disposed on the first base substrate, wherein a metal platform of the at least one metal platform is integrated with a corresponding gate line of the plurality of gate lines, and the metal platform includes a first protrusion and a second protrusion that are arranged on both sides of the corresponding gate line along a second direction, respectively, the first direction intersecting the second direction;
an opposite substrate, disposed opposite to the array substrate;
a liquid crystal layer, disposed between the array substrate and the opposite substrate; and
a plurality of spacers, disposed on a side of the opposite substrate proximate to the array substrate, wherein
at least one spacer of the plurality of spacers is disposed opposite to the at least one metal platform; and an orthographic projection of an end, proximate to the first base substrate, of each of the at least one spacer on the first base substrate is located within an orthographic projection of a corresponding metal platform of the at least one metal platform on the first base substrate; and
a shape of the orthographic projection of the corresponding metal platform on the first base substrate is substantially same as a shape of the orthographic projection of the end, proximate to the first base substrate, of each of the at least one spacer on the first base substrate.

9. The display panel according to claim 8, wherein a minimum distance between a border of the orthographic projection of the end, proximate to the first base substrate, of each of the at least one spacer on the first base substrate and a border of the orthographic projection of the corresponding metal platform of the at least one metal platform on the first base substrate is greater than zero.

10. The display panel according to claim 8, wherein in a same direction, for the orthographic projection of the corresponding metal platform on the first base substrate, a dimension passing through a geometric center thereof is a first dimension; and
for the orthographic projection of the end, proximate to the first base substrate, of each of the at least one spacer on the first base substrate, a dimension passing through a geometric center thereof is a second dimension;
the first dimension is greater than or equal to a sum of the second dimension and a fitting allowance of the array substrate and the opposite substrate.

11. The display panel according to claim 10, the first dimension is greater than or equal to 1.43 times to 2.8 times the second dimension, inclusive.

12. The display panel according to claim 8, wherein a ratio of an area of the orthographic projection of the corresponding metal platform on the first base substrate to an area of the orthographic projection of the end, proximate to the first base substrate, of each of the at least one spacer on the first base substrate is in a range of 4:1 to 5:1, inclusive.

13. The display panel according to claim 8, wherein the plurality of spacers include a plurality of first spacers and at least one second spacer; along a direction perpendicular to a surface of the first base substrate where the plurality of gate lines and the at least one metal platform are arranged, a dimension of each first spacer is greater than a dimension of each second spacer; and
the at least one spacer disposed opposite to the at least one metal platform is the at least one second spacer.

14. An array substrate, comprising:
a first base substrate;
a plurality of common electrode lines, disposed on the first base substrate and extending in a first direction;
at least one metal platform, disposed on the first base substrate, wherein a metal platform of the at least one metal platform is integrated with a corresponding common electrode line of the plurality of common electrode lines, and the metal platform includes a third protrusion and a fourth protrusion that are arranged on both sides of the corresponding common electrode line along a second direction, respectively, the first direction intersecting the second direction; and
a plurality of gate lines, disposed on the first base substrate and extending in the first direction, wherein
a portion, proximate to the third protrusion, of a gate line adjacent to the corresponding common electrode line includes a depression; and the depression has an opening facing the third protrusion, and a shape of the depression matches a shape of a contour of the third protrusion.

15. The array substrate according to claim 14, further comprising a plurality of pixel electrodes disposed on the first base substrate, wherein
for a pixel electrode closest to the metal platform, an orthographic projection of the pixel electrode on the first base substrate is non-overlapping with an orthographic projection of the metal platform on the first base substrate; and/or
further comprising a plurality of common electrodes disposed on the first base substrate, wherein
for a common electrode that is electrically connected to the corresponding common electrode line and closest to the metal platform, an orthographic projection of the common electrode on the first base substrate is non-overlapping with an orthographic projection of the metal platform on the first base substrate.

16. The array substrate according to claim 15, wherein the pixel electrode has a notch proximate to the fourth protrusion, and/or the common electrode has a notch proximate to the fourth protrusion.

17. A display panel, comprising:
the array substrate according to claim 14;
an opposite substrate, disposed opposite to the array substrate;
a liquid crystal layer, disposed between the array substrate and the opposite substrate; and
a plurality of spacers, disposed on a side of the opposite substrate proximate to the array substrate, wherein
at least one spacer of the plurality of spacers is disposed opposite to the at least one metal platform; and an orthographic projection of an end, proximate to the first base substrate, of each of the at least one spacer on the first base substrate is located within an orthographic projection of a corresponding metal platform of the at least one metal platform on the first base substrate.

* * * * *